(12) United States Patent
Ito et al.

(10) Patent No.: US 9,133,942 B2
(45) Date of Patent: Sep. 15, 2015

(54) VALVE STRUCTURE FOR FLUID PRESSURE DEVICE

(75) Inventors: Shinichi Ito, Toride (JP); Michihiro Hanada, Tsukubamirai (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 13/581,508

(22) PCT Filed: Sep. 16, 2010

(86) PCT No.: PCT/JP2010/066035
§ 371 (c)(1),
(2), (4) Date: Aug. 28, 2012

(87) PCT Pub. No.: WO2011/114553
PCT Pub. Date: Sep. 22, 2011

(65) Prior Publication Data
US 2012/0325339 A1     Dec. 27, 2012

(30) Foreign Application Priority Data

Mar. 16, 2010 (JP) .................................. 2010-059403

(51) Int. Cl.
*F16K 1/46* (2006.01)
*G05D 16/06* (2006.01)
*F16K 17/04* (2006.01)

(52) U.S. Cl.
CPC ................. *F16K 1/46* (2013.01); *F16K 17/044* (2013.01); *G05D 16/0666* (2013.01); *Y10T 137/7793* (2015.04)

(58) Field of Classification Search
CPC ..... F16K 1/46; F16K 17/044; G05D 16/0666; Y10T 137/7793
USPC ................. 251/332, 333, 334, 358; 137/505; 277/500, 502, 584, 585
See application file for complete search history.

(56) References Cited

U.S. PATENT DOCUMENTS 2,845,945 A * 8/1958 Mancusi, Jr. .................. 137/469
3,248,056 A * 4/1966 Obermaier ...................... 236/34
(Continued)

FOREIGN PATENT DOCUMENTS

CN     2052095 U     1/1990
CN     1081766 C     3/2002
(Continued)

OTHER PUBLICATIONS

Combined Office Action and Search Report issued Jan. 10, 2014 in Chinese Application No. 201080065450.9 (With English Translation).

(Continued)

*Primary Examiner* — Kevin Murphy
*Assistant Examiner* — Daphne M Barry
(74) *Attorney, Agent, or Firm* — Oblon, McClelland, Maier & Neustadt, L.L.P.

(57) ABSTRACT

A valve structure for a fluid pressure device. A valve element for constituting a pressure reducing valve is provided with a first housing which is interconnected with a stem, a second housing which is provided on the outer peripheral side of the first housing, and packing which is provided between the first housing and the second housing. The packing is mounted and sandwiched between a tapered section of the first housing and an outer wall section of the second housing, and thereby the packing is affixed. A first tube section of the first housing is inserted into a second tube section of the second housing, and the first housing and the second housing are affixed integrally to each other by, for example, welding or adhesion.

10 Claims, 10 Drawing Sheets

(56) References Cited

U.S. PATENT DOCUMENTS

| | | | |
|---|---|---|---|
| 3,877,480 A * | 4/1975 | Hughes et al. | 137/329.06 |
| 4,518,329 A * | 5/1985 | Weaver | 417/566 |
| 4,671,490 A * | 6/1987 | Kolenc et al. | 251/335.2 |
| 4,688,757 A * | 8/1987 | Cook et al. | 251/210 |
| 4,848,729 A * | 7/1989 | Danzy | 251/332 |
| 7,905,254 B2 | 3/2011 | Takeda et al. | |
| 2005/0023496 A1 * | 2/2005 | Foster | 251/191 |

FOREIGN PATENT DOCUMENTS

| JP | 50 74078 | 6/1975 |
|---|---|---|
| JP | 57 8949 | 1/1982 |
| JP | 59 226771 | 12/1984 |
| JP | 63 96367 | 4/1988 |
| JP | 7 2742 | 1/1995 |
| JP | 10 78166 | 3/1998 |
| JP | 3771646 B2 | 4/2006 |
| JP | 2006 329353 | 12/2006 |

OTHER PUBLICATIONS

Combined Office Action and Search Report issued Jun. 21, 2013 in Chinese Application No. 201080065450.9 (With English Translation).

International Search Report Issued Dec. 7, 2010 in PCT/JP10/66035 Filed Sep. 16, 2010.

* cited by examiner

VALVE STRUCTURE FOR FLUID PRESSURE DEVICE

TECHNICAL FIELD

The present invention relates to a valve structure for a fluid pressure device for controlling the flow condition of a pressure fluid in a fluid pressure device that is driven by supplying the pressure fluid thereto.

BACKGROUND ART

Heretofore, a fluid pressure device (for example, a relief valve, a pressure reducing valve, etc.) has been used to control the flow rate of a pressure fluid that flows through a flow path.

In a relief valve, which functions as a fluid pressure device of this type, for example, as disclosed in Japanese Laid-Open Patent Publication No. 2006-329353, a valve plug is provided that is movable in an axial direction in the interior of a main valve body. The valve plug is made up from a shaft, and an umbrella-shaped valve plug member that is formed on one end of the shaft, the valve plug member being arranged inside a flow path through which a fluid flows. A seal member is disposed through an annular groove on the outer circumference of the valve plug member, such that when the valve plug is moved, by abutment of the seal member against an inner circumferential surface of the main valve body, communication between a fluid inlet passage and a relief passage that constitute parts of the flow path is blocked.

With the valve structure of the above-described relief valve, for example, although the seal member is mounted in the annular groove of the valve plug, in the event that fluid flows in between the annular groove and the seal member, there is a concern that the seal member can be made to peel away and separate from the annular groove by the fluid. As a result, it is thought that the sealing performance, i.e., the capability of the seal member to seal the fluid, tends to be lowered. With the aim of preventing peeling away of this type of seal member, it has been considered to bond the seal member with respect to the annular groove using an adhesive or the like. However, in this case, a step is required to apply or coat the adhesive, which increases the number of assembly steps needed to assemble the relief valve.

SUMMARY OF INVENTION

A general object of the present invention is to provide a valve structure for a fluid pressure device, which is capable of obtaining a stable sealing performance, together with improving manufacturability and durability of the fluid pressure device.

The present invention is a valve structure for a fluid pressure device having ports for supplying and discharging a pressure fluid, and which is capable of adjusting a flow condition of the pressure fluid that flows in the interior of a body through the ports, comprising:

a casing disposed displaceably in the interior of the body;
an annular seal member disposed in the interior of the casing, and which is seatable on a valve seat formed in the body; and
a retaining member disposed in the interior of the casing, and which retains the seal member between the retaining member and the casing,
wherein the casing and the retaining member are mounted together integrally, and the casing and the seal member are displaceable, through a stem connected to a center portion of the casing, in directions to approach toward and separate away from the valve seat.

According to the present invention, in the valve structure for a fluid pressure device, in a state in which the seal member is provided in the interior of the casing, by providing the seal member and connecting the same integrally with the casing, the seal member can easily and reliably be retained between the casing and the retaining member, and a stable sealing performance by the seal member can be obtained. Further, for example, compared to the case of bonding the seal member with respect to the casing, ease in manufacturing the valve structure can be enhanced and manufacturing costs can be reduced. Furthermore, because the material quality of the seal member can be set freely, the sealing performance achieved by the seal member can be enhanced, while in addition, durability can be improved.

DESCRIPTION OF EMBODIMENTS

Figure 1:
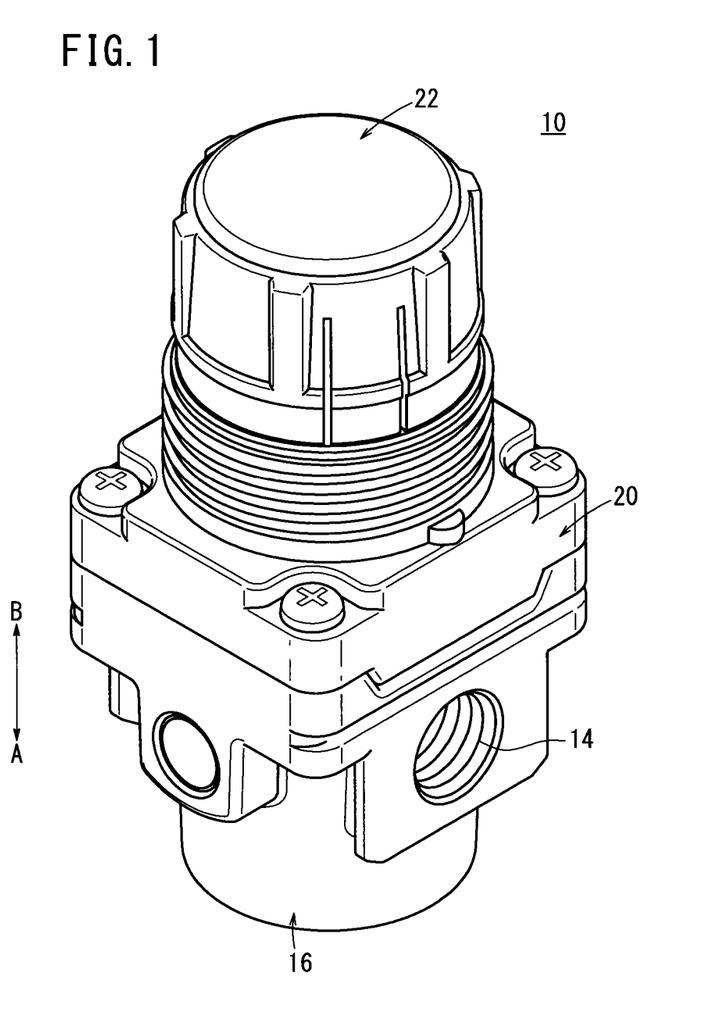
FIG. 1 is an exterior perspective view of a pressure reducing valve to which a valve mechanism for a fluid pressure device is applied according to a first embodiment of the present invention.

In FIG. 1, reference numeral 10 indicates a pressure reducing valve to which a valve structure for a fluid pressure device is applied according to a first embodiment of the present invention.

As shown in FIGS. 1 through 4, the pressure reducing valve 10 includes a body 16 having a primary side port 12 and a secondary side port 14, a valve mechanism 18 that switches the flow condition of a fluid that flows from the primary side port 12 to the secondary side port 14, a bonnet 20 fitted to an upper portion of the body 16, and a rotatable handle 22 disposed on an upper portion of the bonnet 20.

Figure 2:
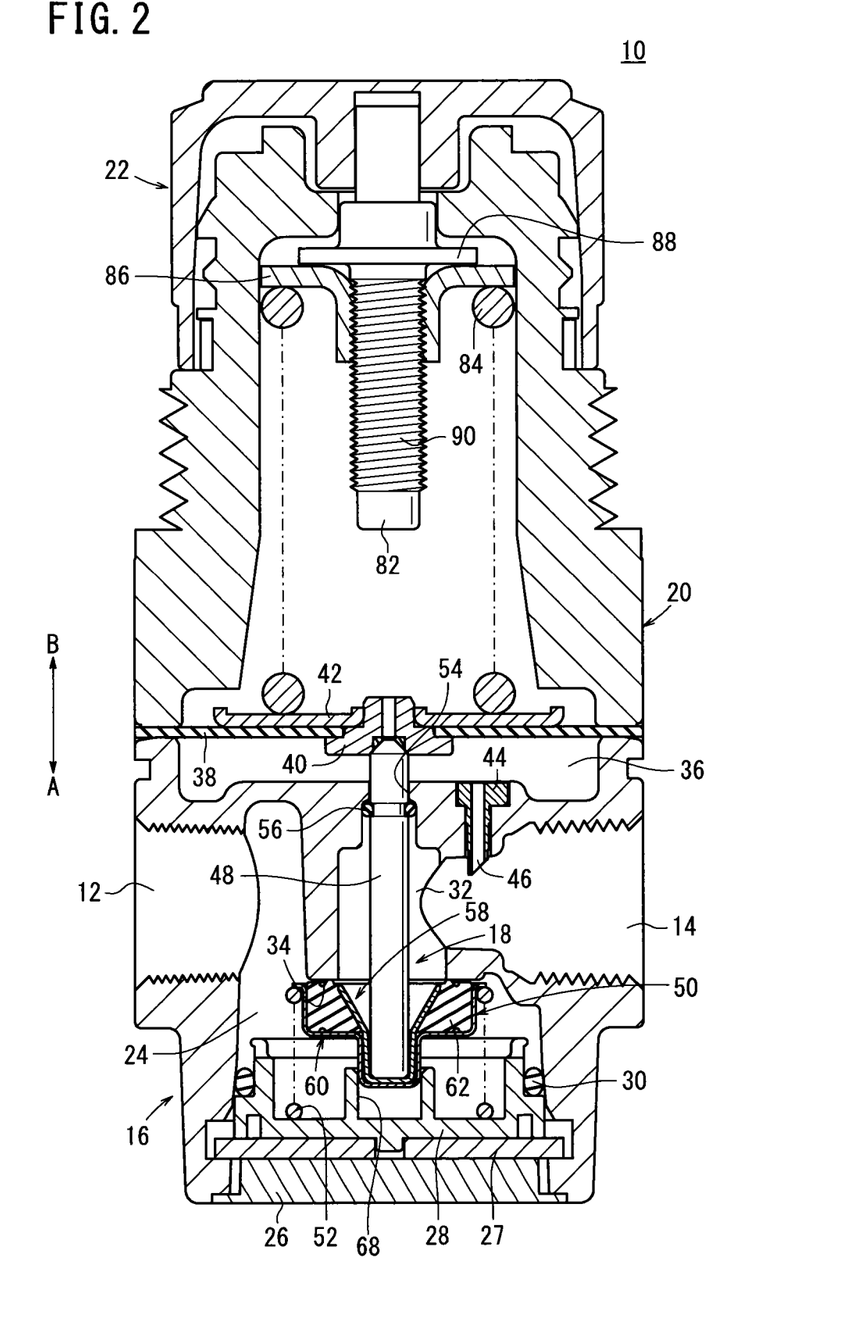
FIG. 2 is an overall vertical cross sectional view of the pressure reducing valve shown in FIG. 1.

In the body 16, the primary side port 12 and the secondary side port 14 are formed on a substantially straight line with a communication chamber 24 formed therebetween. The communication chamber 24 opens in a downward direction (in the direction of the arrow A). A cap 26 is mounted in and seals the opening region thereof. On an upper portion of the cap 26, a spring holder 28 is mounted that sandwiches a cover plate 27 between the spring holder 28 and the cap 26, and which also retains a valve spring 52 that makes up part of the valve mechanism 18, to be described later. An annular o-ring 30 is mounted on an outer circumferential surface of the spring holder 28, which abuts against an inner wall surface of the communication chamber 24.

Further, in the communication chamber 24, a communication passage 32 is provided through which the primary side port 12 and the secondary side port 14 communicate. In an opening of the communication passage 32, an annular valve seat 34 is formed on which a later-described valve plug 50 of the valve mechanism 18 is seated. The valve seat 34 is formed on a lower side (in the direction of the arrow A) facing toward a region where the communication chamber 24 opens.

On the other hand, a diaphragm chamber 36 is formed between the bonnet 20 and the upper end of the body 16 with a diaphragm 38 disposed therein, the circumferential edge of the diaphragm 38 being sandwiched between the body 16 and the bonnet 20. The diaphragm 38 is formed, for example, as a thin membrane from an elastic material. A base holder 40 is disposed in a central portion of the diaphragm 38, and on an upper side surface of the base holder 40, a disk-shaped retaining plate 42 is disposed, which is fitted over a central part of the base holder 40.

More specifically, the central portion of the diaphragm 38 is supported from the bottom by the base holder 40, and also is supported by the retaining plate 42 within a radially outward predetermined region thereof about the base holder 40. The central region of the diaphragm 38 is gripped by both the base holder 40 and the retaining plate 42.

In addition, the diaphragm 38 is flexible between the central and the outer edge portions thereof by displacement of the central portion of the diaphragm 38 in the axial directions (the directions of arrows A and B) together with the base holder 40.

A tubular body 44, which is substantially parallel with the axis of the body 16, is disposed between the diaphragm chamber 36 and the communication passage 32. The communication passage 32 and the diaphragm chamber 36 communicate through a bypass passage 46, which penetrates through the center of the tubular body 44.

Figure 3:
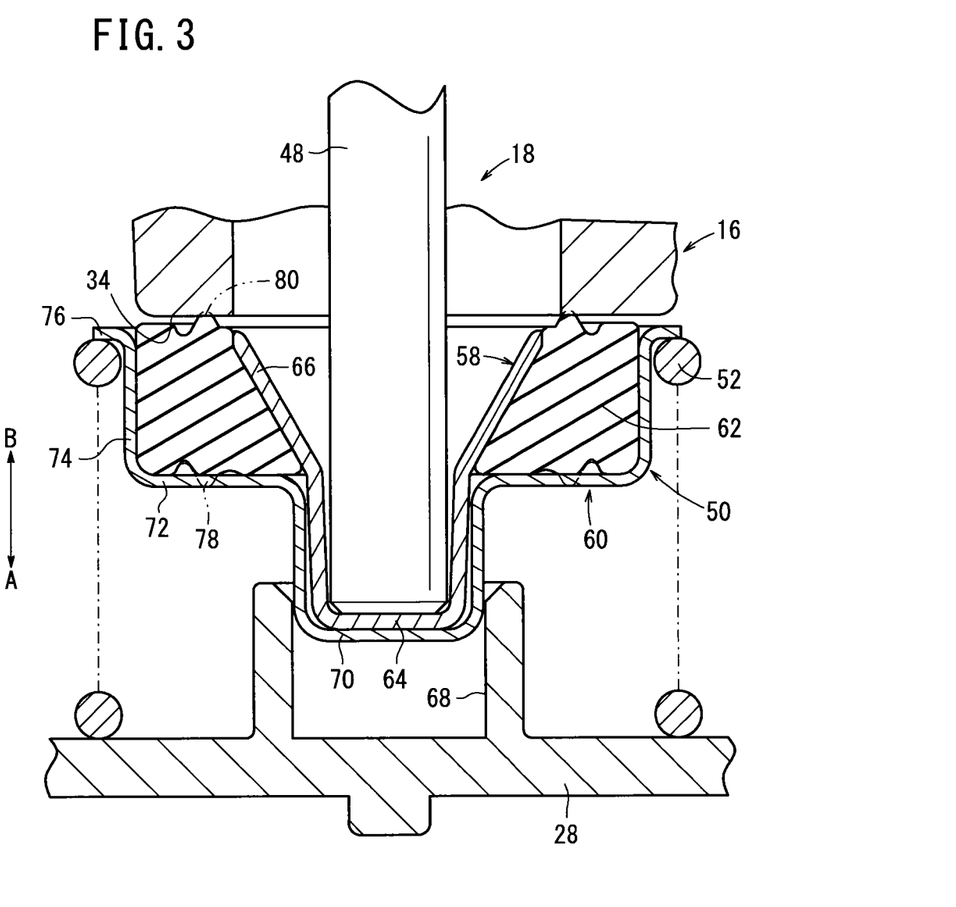
FIG. 3 is an enlarged cross sectional view showing the vicinity of a valve mechanism in the pressure reducing valve of FIG. 2.

The valve mechanism 18 comprises a stem 48 disposed in the interior of the body 16 and which is displaceable in the communication chamber 24 along the axial directions (the directions of arrows A and B), the valve plug 50 connected to a lower end of the stem 48, and the valve spring 52 that urges the valve plug 50 toward the side of the valve seat 34.

The stem 48 is formed as a shaft having a predetermined length along the axial directions (the directions of arrows A and B), and the stem 48 is inserted displaceably through a stem hole 54 that communicates with the communication passage 32 and penetrates therethrough along the axial direction of the body 16. An annular seal ring 56 is mounted on the outer circumferential surface of the stem 48. Due to sliding contact of the seal ring 56 with the inner circumferential surface of the stem hole 54, leakage of fluid between the stem 48 and the stem hole 54 is prevented.

An upper end of the stem 48 is inserted through the stem hole 54 into a recess defined in the base holder 40. The lower end of the stem 48 is connected to a first housing (retaining member) 58 (discussed later) that makes up part of the valve plug 50.

The valve plug 50 is made up from the first housing 58 connected to the stem 48, a second housing (casing) 60 disposed on an outer circumferential side of the first housing 58, and a packing (seal member) 62 disposed between the first housing 58 and the second housing 60.

The first and second housings 58, 60 are formed, for example, by press-forming a thin-plate member made of a metallic material such as stainless steel or the like. The first housing 58 is constituted from a first cylindrical member (first connector) 64 formed in a bottomed tubular shape, and a tapered part 66 that extends while expanding gradually in diameter in a radial outward direction from an open end of the first cylindrical member 64. Additionally, when the valve plug 50 including the first housing 58 is disposed inside the communication chamber 24, the first cylindrical member 64 is inserted into a guide hole 68 formed in a central portion of the spring holder 28.

More specifically, the guide hole 68 of the spring holder 28 is provided in order to guide the first cylindrical member 64 for displacement in the axial directions (the directions of arrows A and B), and the guide hole 68 functions as a guide mechanism that guides the valve plug 50 including the first cylindrical member 64 in the axial directions (the directions of arrows A and B).

The second housing 60 is constituted from a second cylindrical member (second connector) 70 having a bottomed tubular shape, a flat part 72 that extends in a radial outward direction from the open end of the second cylindrical member 70, an outer wall (seal retainer) 74 that is bent perpendicular to and extends from the circumferential edge of the flat part 72, and a flange 76 on the end of the outer wall 74 which is bent in a horizontal direction. The second cylindrical member 70 has a larger diameter than the first cylindrical member 64 of the first housing 58, and the first cylindrical member 64 is inserted inside the second cylindrical member 70. In addition, the end of the first cylindrical member 64 and the end of the second cylindrical member 70 may be connected together integrally, for example, by welding, bonding, or the like.

The first housing 58 and the second housing 60 are formed with substantially the same height dimension along the axial direction (the direction of arrows A and B).

In addition, in a state in which the first housing 58 and the second housing 60 are connected together, the lower end of the stem 48 is inserted into the first cylindrical member 64 of the first housing 58 and abuts against the bottom wall of the first cylindrical member 64.

The packing 62 is formed in a ring shape from an elastic material, for example, such as rubber or the like, and is installed between the tapered part 66 of the first housing 58 and the outer wall 74 of the second housing 60. Stated otherwise, the second housing 60 abuts against the outer circumferential surface of the packing 62, whereas the first housing 58 abuts against the inner circumferential surface of the packing 62.

In addition, the inner circumferential surface of the packing 62 is formed with a substantially trapezoidal shape in cross section, reducing gradually in diameter in a downward direction. The inner circumferential surface of the packing 62 is pressed radially outward by the tapered part 66 of the first housing 58, and the packing 62 is fixed in position as a result of being sandwiched between the tapered part 66 and the outer wall 74 of the second housing 60.

In greater detail, when the outer wall 74 of the second housing 60 is pressed in a radial inward direction by pressure from the pressure fluid supplied to the interior of the communication chamber 24, the outer circumferential surface of the packing 62 is pressed radially inward in a similar manner, such that the inner circumferential surface abuts against the tapered part 66 of the first housing 58. Consequently, dislodgement of the packing 62 is prevented by the tapered part 66.

Further, in a condition of being installed between the first housing 58 and the second housing 60, the packing 62 is arranged such that one end surface thereof faces toward the flat part 72 of the second housing along the axial directions (the directions of arrows A and B), and the other end surface thereof faces toward the exterior between the tapered part 66 of the first housing 58 and the outer wall 74 of the second housing 60. Moreover, the other end surface projects outside just slightly from the edges of the tapered part 66 and the outer wall 74.

A first sealing part 78 that projects in an annular shape at a predetermined height along the axial direction (in the direction of the arrow A) is provided on one end surface of the packing 62. By abutment of the first sealing part 78 against the flat part 72, flow of fluid between the second housing 60 and the packing 62 is prevented. On the other hand, on the other end surface of the packing 62, a second sealing part 80 is formed that projects in an annular shape at a predetermined height along the axial direction (in the direction of the arrow B). As will be described later, by seating of the second sealing part 80 on the valve seat 34 of the body 16, flow of fluid between the body 16 and the valve plug 50 is blocked.

Stated otherwise, the first sealing part 78 and the second sealing part 80 are formed to project outwardly in mutually opposite directions on the packing 62.

The valve spring 52 is constituted, for example, from a coil spring that is wound in a spiral shape, which is interposed between the spring holder 28 and the flange 76 of the second housing 60. The valve spring 52 normally urges the valve plug 50 including the second housing 60 toward the side of the valve seat 34, or more specifically, in a direction (the direction of the arrow B) away from the spring holder 28.

The bonnet 20 is formed in a cylindrical shape and is connected to the upper end of the body 16. A rotatable shaft 82, a pressure-adjusting spring 84 disposed on an outer circumferential side of the shaft 82, and a holder 86 that is screw-engaged with the shaft 82, are accommodated in the interior of the bonnet 20.

A flange 88, which is expanded in a radial outward direction, is formed on the shaft 82 at a substantially central portion along the axial direction thereof. Threads 90 are formed on the outer circumferential surface of the shaft 82 beneath the flange 88. On the other hand, the upper end of the shaft 82 projects at a predetermined height from an upper portion of the bonnet 20 and is inserted into a later-described opening of the handle 22.

The pressure-adjusting spring 84 is constituted by a coil spring, for example, which is interposed between the holder 86 and the retaining plate 42. An elastic force of the pressure-adjusting spring 84 urges the holder 86 and the retaining plate 42 in directions to separate mutually away from each other.

A central portion of the holder 86 is screw-engaged with the threads 90 of the shaft 82, whereby the holder 86 is made displaceable along the axial directions by rotation of the shaft 82. In addition, by displacing the holder 86 downwardly along the shaft 82, the pressure-adjusting spring 84 is pressed downwardly (in the direction of the arrow A). Further, when the holder 86 is displaced upwardly (in the direction of the arrow B), the flange 88 of the shaft 82 functions as a stopper for restricting upward displacement of the holder 86.

The handle 22 is formed in a bottomed cylindrical shape and is disposed so as to cover the upper end of the bonnet 20. The upper end of the shaft 82 is fitted into a central part of the handle 22. By a non-illustrated operator manipulating the handle 22 to cause rotation thereof, the shaft 82 is rotated integrally with the handle 22, thereby causing the holder 86 to be advanced and retracted along the axial directions of the shaft 82.

The pressure reducing valve 10, to which the valve structure according to the first embodiment of the present invention is applied, is constructed basically as described above. Next, a brief explanation will be provided concerning assembly of the valve plug 50 constituting the valve mechanism 18.

First, the second housing 60 is positioned such that the second cylindrical member 70 thereof is oriented downward, and the packing 62 is inserted into the interior of the second housing 60 from the opened upward portion thereof. At this time, the inner circumferential surface of the packing 62 is expanded maximally, and the packing 62 is inserted such that the other end surface on which the second sealing part 80 is formed faces upwardly, while the outer circumferential surface thereof abuts against the outer wall 74 of the second housing 60. Stated otherwise, the packing 62 is inserted such that the first sealing part 78 is placed in abutment against the flat part 72 of the second housing 60.

Next, the first housing 58 is grasped with the first cylindrical member 64 thereof oriented downwardly, the first housing 58 is inserted into the second housing 60 from above, and after insertion through the inside part of the packing 62, the first cylindrical member 64 is inserted into the interior of the second cylindrical member 70. As a result, the inner circumferential surface of the packing 62 comes into abutment against the tapered part 66 of the first housing 58, whereby the packing 62 is retained between the first housing 58 and the second housing 60.

Lastly, in a condition in which the bottom wall of the first cylindrical member 64 and the bottom wall of the second cylindrical member 70 are in contact with each other, by means of a non-illustrated welding apparatus, the first cylindrical member 64 and the second cylindrical member 70 are welded together (for example, by spot welding). As a result, the first cylindrical member 64 and the second cylindrical member 70 are connected together firmly, accompanied by the first housing 58 and the second housing 60 being fixed together mutually in an assembled state.

At this time, the packing 62 is gripped and retained between the tapered part 66 of the first housing 58 and the outer wall 74 of the second housing 60, and together therewith, the tapered part 66 is inclined gradually in an upward direction so as to approach the side of the outer wall 74. Owing thereto, when the outer wall 74 is pressed in a radial inward direction by pressure from the pressure fluid supplied to the interior of the communication chamber 24, the outer circumferential surface of the packing 62 is pressed similarly in a radial inward direction, and the inner circumferential surface thereof abuts against the tapered part 66 of the first housing 58, whereby dislodgement of the packing 62 is prevented from occurring by the tapered part 66. More specifically, the packing 62 is prevented from passing through between the tapered part 66 and the outer wall 74 and becoming dislodged to the outside. Stated otherwise, the tapered part 66 functions as a dislodgement prevention means for preventing the packing 62 from becoming dislodged from the first and second housings 58, 60. The stem 48 is inserted into the first housing 58 from above, and the lower end of the stem 48 is inserted into the interior of the first cylindrical member 64 and placed in abutment against the bottom wall thereof.

Next, an explanation shall be given concerning operations and advantages of the pressure reducing valve 10 including the valve mechanism 18, which is assembled in the above-described manner. As shown in FIG. 3, a valve-closed state, in which the valve plug 50 is urged upwardly (in the direction of the arrow B) by the elastic force of the valve spring 52, and the packing 62 abuts against the valve seat 34, shall be described as an initial condition.

First, in the initial condition, a pressure fluid from a non-illustrated pressure fluid supply source is supplied through tubing or the like to the primary side port 12. Together therewith, a non-illustrated operator turns the handle 22 in a given direction to set the pressure of the pressure fluid to be supplied to a fluid pressure device (not shown), which is connected through tubing or the like to the secondary side port 14.

Figure 4:
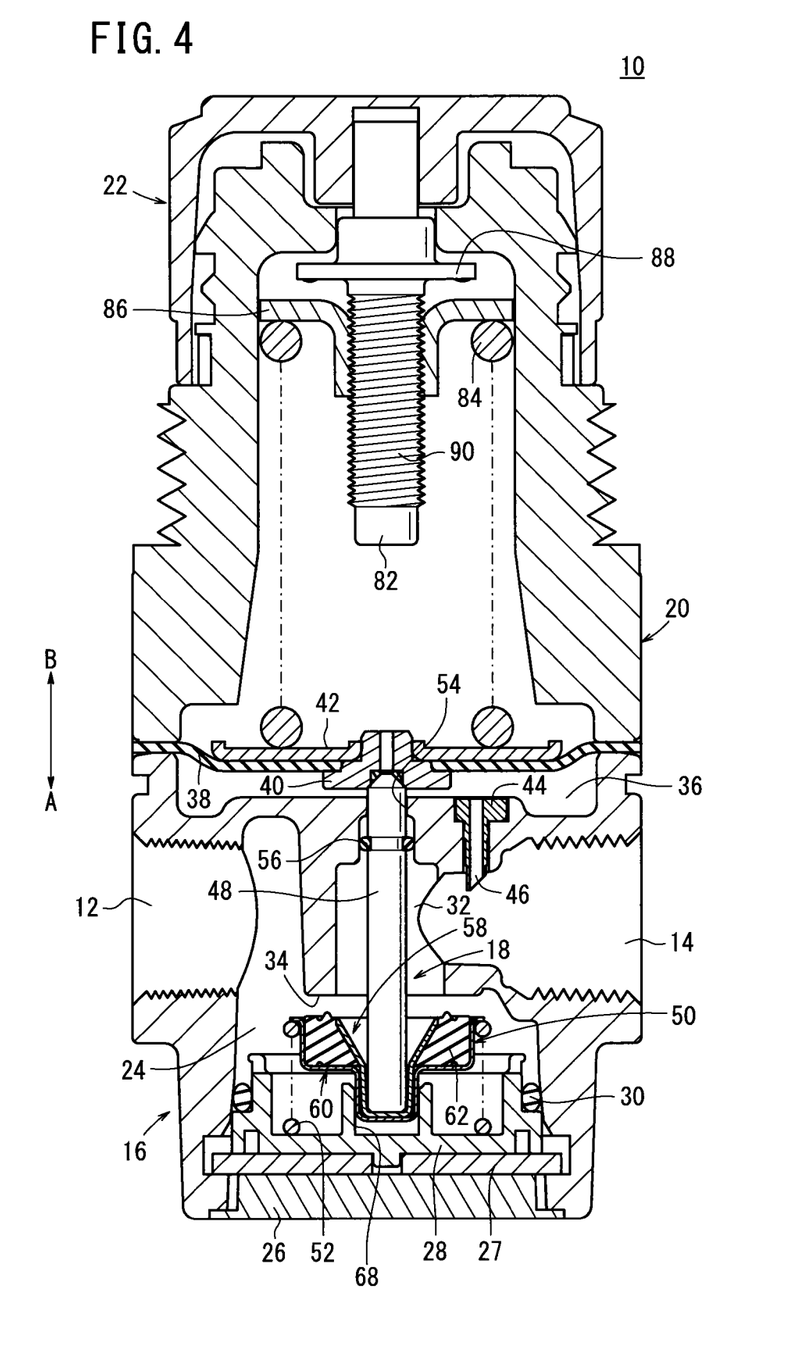
FIG. 4 is an overall vertical cross sectional view showing a condition in which a valve plug is displaced downwardly to place a primary side port and a second side port in communication, in the pressure reducing valve shown in FIG. 2.

At this time, the holder 86 is displaced downwardly by rotating the handle 22, and because the pressure-adjusting spring 84 is pressed by the holder 86, the diaphragm 38 is pressed downward (in the direction of the arrow A) through the retaining plate 42 by the elastic force of the pressure-adjusting spring 84. Consequently, the base holder 40 descends together with the diaphragm 38, and the stem 48 and the valve plug 50 are pressed downwardly in opposition to the elastic force of the valve spring 52. As a result, as shown in FIG. 4, the valve plug 50 separates away from the valve seat 34 to produce a valve-open state in which the primary side port 12 and the secondary side port 14 communicate through the communication passage 32 and the communication chamber 24.

In the case that the pressure of the pressure fluid supplied from the secondary side port 14 to the fluid pressure device (hereinafter referred to as the "secondary side pressure") is lowered with respect to the pressure of the pressure fluid supplied from the pressure fluid supply source to the primary side port 12 (hereinafter referred to as the "primary side pressure"), a portion of the pressure fluid that passes through the communication passage 32 and flows to the secondary side port 14 is supplied to the interior of the diaphragm chamber 36 through the bypass passage 46 and presses upwardly on the diaphragm 38. Consequently, the pressing force that presses upwardly on the diaphragm 38 acts in opposition to the elastic force of the pressure-adjusting spring 84, which is urged downwardly with respect to the diaphragm 38, whereby the secondary side pressure of the pressure fluid, which is supplied to the fluid pressure device from the secondary side port 14, is adjusted in pressure.

In this manner, in the case that the secondary side pressure becomes lower than the set pressure, which is set beforehand by rotation of the handle 22, then supply of the pressure fluid to the fluid pressure device (not shown) through the secondary side port 14 is continued, and as the difference between the secondary side pressure and the primary side pressure becomes smaller, the diaphragm 38 is displaced upwardly gradually in opposition to the elastic force of the pressure-adjusting spring 84, and by the stem 48 and the valve plug 50 rising together with the diaphragm 38, the flow rate of the pressure fluid that flows between the valve plug 50 and the valve seat 34 is reduced.

Additionally, once the preset pressure has been reached, the valve plug 50 is seated on the valve seat 34, whereby the supply of pressure fluid from the primary side port 12 to the secondary side port 14 is interrupted, and the secondary side pressure is maintained. Owing thereto, the pressure fluid at the secondary side pressure, which has been adjusted to the set pressure, is supplied to the fluid pressure device that is connected to the secondary side port 14.

In the foregoing manner, according to the first embodiment, the first housing 58 and the second housing 60, which are formed from metallic materials, are provided in the valve plug 50 that constitutes the valve mechanism 18. Also, the first housing 58 is disposed on the inside of the second housing 60, which is disposed on the outer circumferential side of the first housing 58, and the packing 62, which is made from an elastic material, is disposed between the second housing 60 and the first housing 58.

In this manner, because the packing 62 can reliably be installed and retained by a simple operation of assembling the first housing 58 and the second housing 60, a stable sealing performance by the packing 62 can be obtained. Further, because the first and second sealing parts 78, 80 are provided on respective end surfaces of the packing 62, by abutment of the first sealing part 78 against the second housing 60, pressure fluid can reliably be prevented from flowing between the packing 62 and the second housing 60. As a result, flow of the pressure fluid can reliably be prevented by the packing 62, without leading to peeling away of the packing 62 when the pressure fluid flows in between the packing 62 and the housing, which has been of concern in the conventional technique in which a packing 62 is simply bonded to the housing.

Moreover, because in the assembly process for the valve plug 50, the step, which has been carried out in the conventional technique, of coating an adhesive with respect to the packing 62 or the housing is rendered unnecessary, manufacturing efficiency can be improved, and together therewith, because the cost required for such an adhesive is not required, manufacturing costs can be reduced.

Furthermore, with the conventional technique of adhering a sealing member with respect to the casing, for example, in the case of using a sealing material made from a material that is high in chemical resistance, the adhesive force thereof is reduced, and fixing or adherence between the sealing member and the casing becomes insufficient. However, with the structure of the present invention, any limitations on the materials used for the packing 62 can be avoided, and a packing 62 can appropriately be selected and used, for example, from among materials having a desired sealing capability corresponding to pressure values and the type of pressure fluid to be handled, while enabling the packing 62 to be fixed reliably with respect to the first housing 58 and the second housing 60. Consequently, the sealing performance by the packing 62 can be enhanced.

Still further, because the first sealing part 78, which abuts against the flat part 72 of the second housing 60, is provided on the end surface of the packing 62, pressure fluid supplied to the interior of the communication chamber 24 can be prevented from passing between the first housing 58 and the packing 62 and from ingressing to the side of the first cylindrical member 64.

Further, with the above-described embodiment, a construction is provided in which the first and second sealing parts 78, 80 are disposed on one end surface and the other end surface of the packing 62, wherein by abutment of the first and second sealing parts 78, 80 against the second housing 60 and the valve seat 34, flow of pressure fluid between the first housing 58 and the second housing 60, as well as flow of pressure fluid between the body 16 and the valve plug 50, are blocked. However, the invention is not limited to such a structure.

Figure 5A:
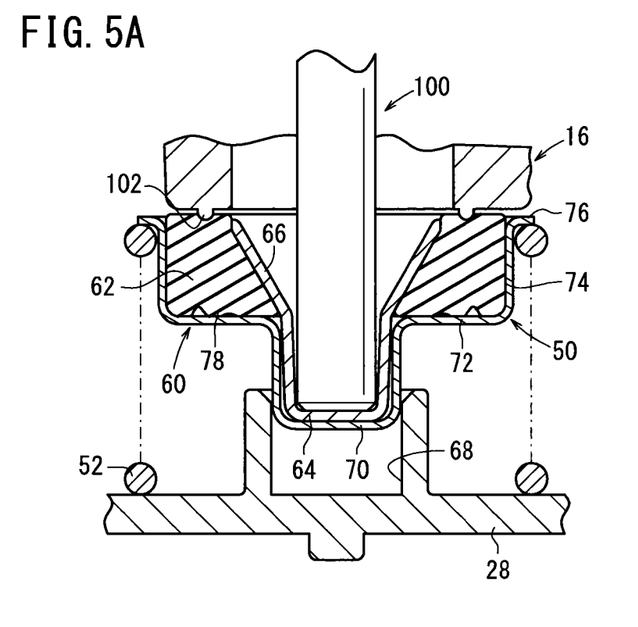
FIG. 5A is an enlarged cross sectional view of the vicinity of a valve mechanism including a valve plug according to a first modification.

For example, instead of providing the second sealing part 80 on the packing 62, an annular first projection 102 that projects toward the packing 62 (in the direction of the arrow A) from an end surface of the valve seat 34 may be provided, as in the valve mechanism 100 according to the first modification shown in FIG. 5A. In this case, when the packing 62 is seated on the valve seat 34, the other end surface thereof abuts reliably against the first projection 102, and therefore, flow of pressure fluid between the packing 62 and the valve seat 34 can reliably be prevented.

Figure 5B:
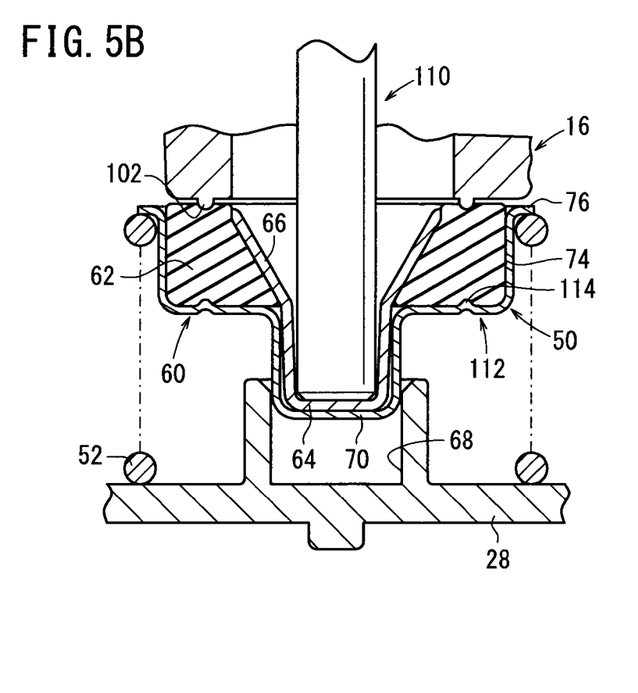
FIG. 5B is an enlarged cross sectional view of the vicinity of a valve mechanism including a valve plug according to a second modification.

Further, instead of the first sealing part 78 being disposed on the packing 62 as was described above, an annular second projection 114 may be provided on the flat part 72 of the second housing 60, which projects toward the side of the packing 62 (in the direction of the arrow B), as in a valve mechanism 110 according to the second modification shown in FIG. 5B, together with the first projection 102 that projects from the end surface of the valve seat 34. In this case, because the first and second projections 102, 114 abut respectively against the one end surface and the other end surface of the packing 62, flow of pressure fluid between the packing 62, the second housing 60, and the valve seat 34 can reliably be prevented. Furthermore, since it is unnecessary to provide the first and second sealing parts 78, 80 on the packing 62, the packing 62 can be manufactured at a reduced cost.

Furthermore, in the second housing 60, the above-described outer wall 74 is not limited to a case of being formed to extend in an upward direction while being bent at a right angle with respect to the flat part 72. For example, an outer wall 122 may be provided, which extends upwardly and is inclined at a predetermined angle to return in a radial inward direction from the edge of the flat part 72, as in a second housing 120 shown in FIG. 6. In this case, the outer wall 122 is inclined with respect to the flat part 72 at an angle of inclination θ2, which is substantially the same as the angle of inclination θ1 of the tapered part 66 of the first housing 58 with respect to the flat part 72 (θ1≈θ2).

Figure 6:
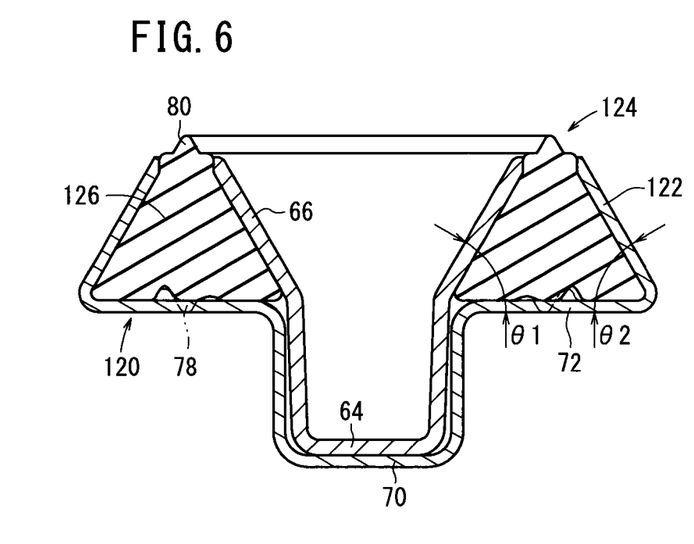
FIG. 6 is an enlarged cross sectional view showing the vicinity of a valve mechanism according to a third modification.

Stated otherwise, in a valve plug 124, the tapered part 66 of the first housing 58 and the outer wall 122 of the second housing 120 are both inclined and formed so as to approach gradually toward one another.

In this case, a packing (seal member) 126 is formed with a triangular shape in cross section tapering in the upward direction. The tapered part 66 of the first housing 58 abuts against the inner circumferential surface, whereas the outer wall 122 of the second housing 120 abuts against the outer circumferential surface thereof, whereby the packing 126 is gripped and retained securely by the tapered part 66 and the outer wall 122.

With the aforementioned valve mechanism 18 of the pressure reducing valve 10 according to the first embodiment, a case has been described in which the first housing 58 and the second housing 60 are connected integrally by welding, bonding, or the like. However, the invention is not limited by this feature.

Figure 7A:
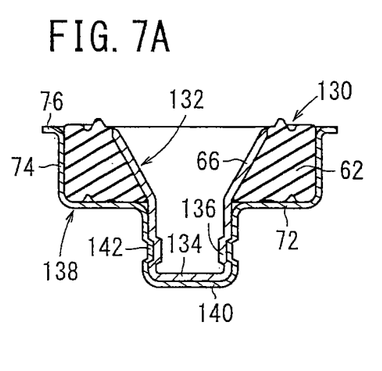
FIGS. 7A through 7E are enlarged cross sectional views showing modified examples of a connecting structure between a first housing and a second housing that constitute the valve plug.

For example, as in a valve plug 130 shown in FIG. 7A, an annular recess 136 may be provided on the outer circumferential surface of a first cylindrical member (first connector) 134 on a first housing 132. After the first cylindrical member 134 has been inserted into a second cylindrical member (second connector) 140 of a second housing 138, the second cylindrical member 140 may be crimped using a crimping jig (not shown) in a radial inward direction from the side of the outer circumferential surface thereof, so that a recessed crimped portion 142 and the annular recess 136 become mutually engaged and the first housing 132 and the second housing 138 are interconnected.

Figure 7B:
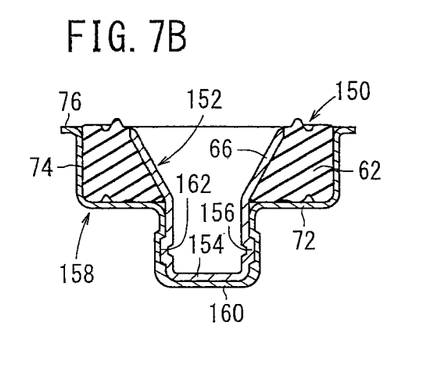

Further, as in a valve plug 150 shown in FIG. 7B, a bulging portion 156 that bulges in a radial outward direction may be provided on a first cylindrical member (first connector) 154 on a first housing 152, and a fitting part 162, which is expanded in diameter corresponding to the bulging portion 156 and has an inner diameter that is slightly smaller than the outer diameter of the bulging portion 156, may be provided on a second cylindrical member (second connector) 160 of a second housing 158 into which the first cylindrical member 154 is inserted. In this case, the bulging portion 156 may be inserted into the second cylindrical member 160 and fitted in engagement with respect to the fitting part 162 to thereby connect the first and second housings 152, 158.

More specifically the first housing 152 and the second housing 158 may be connected together integrally by press-inserting the first cylindrical member 154 with respect to the second cylindrical member 160.

Figure 7C:
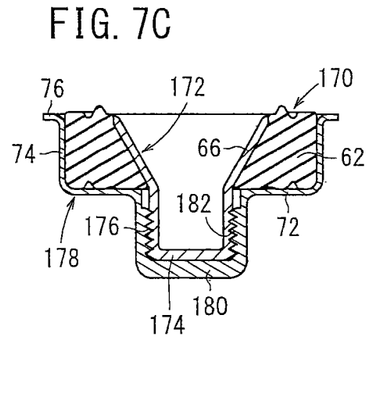

Further, as in a valve plug 170 shown in FIG. 7C, male threads 176 may be engraved on the outer circumferential surface of a first cylindrical member (first connector) 174 on a first housing 172, whereas female threads 182 may be engraved on the inner circumferential surface of a second cylindrical member (second connector) 180 of a second housing 178. In this case, the first housing 172 and the second housing 178 may be connected together integrally by screw-engagement of the first cylindrical member 174 with respect to the inner circumferential surface of the second cylindrical member 180.

Figure 7D:
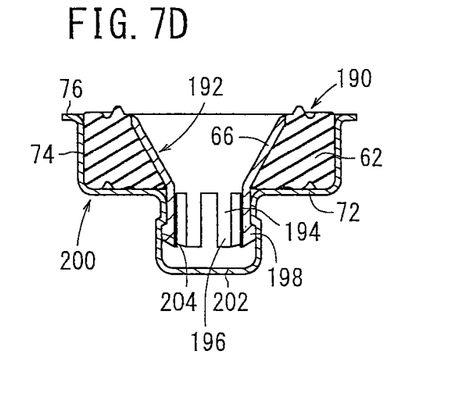

Furthermore, as in a valve plug 190 shown in FIG. 7D, plural ribs 196 that can be inclined freely in a radial direction in the vicinity of an end portion thereof may be provided on a first cylindrical member (first connector) 194 of a first housing 192, together with projections 198, which project radially outward on outer circumferential surfaces of the ribs 196. In this case, when the first cylindrical member 194 is inserted into a second cylindrical member (second connector) 202 on a second housing 200, the projections 198 engage with engagement parts 204, which are expanded in diameter in a radial outward direction on the second cylindrical member 202, and are retained in an engaged condition by the elastic force of the ribs 196. More specifically, the first housing 192 and the second housing 200 may be fixed together integrally through the plural ribs 196.

Figure 7E:
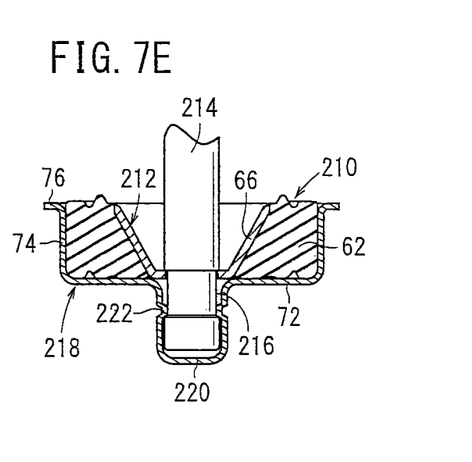

Still further, as in a valve plug 210 shown in FIG. 7E, the lower end of the tapered part 66 on a first housing 212 may be engaged with an annular groove 216 provided on the outer circumferential surface of a stem 214, and together therewith, an engagement part 222, which projects in a radial inward direction, may be provided on a second cylindrical member 220 of a second housing 218 for engagement of the engagement part 222 in a similar manner with respect to the annular groove 216. In this case, the first and second housings 212, 218 may be connected together integrally to the stem 214.

More specifically, a connecting structure may be provided that enables the aforementioned first housing 132, 152, 172, 192, 212 and the second housing 138, 158, 178, 200, 218 to be displaced together integrally, while the first and second housings are restricted against being displaced relative to each other in the axial direction.

Figure 8:
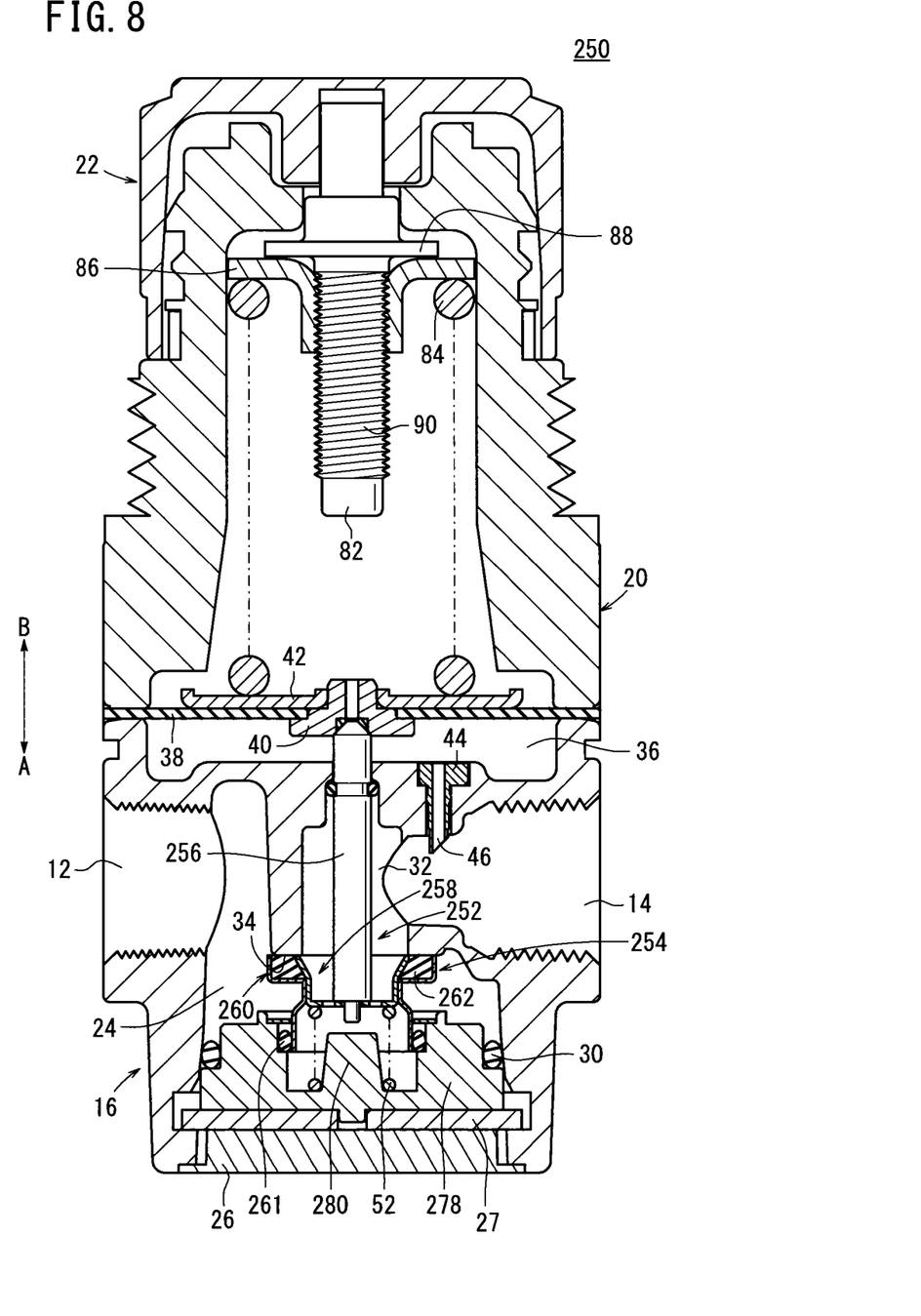
FIG. 8 is an overall vertical cross sectional view of a pressure reducing valve to which a valve mechanism for a fluid pressure device is applied according to a second embodiment of the present invention.
Figure 9:
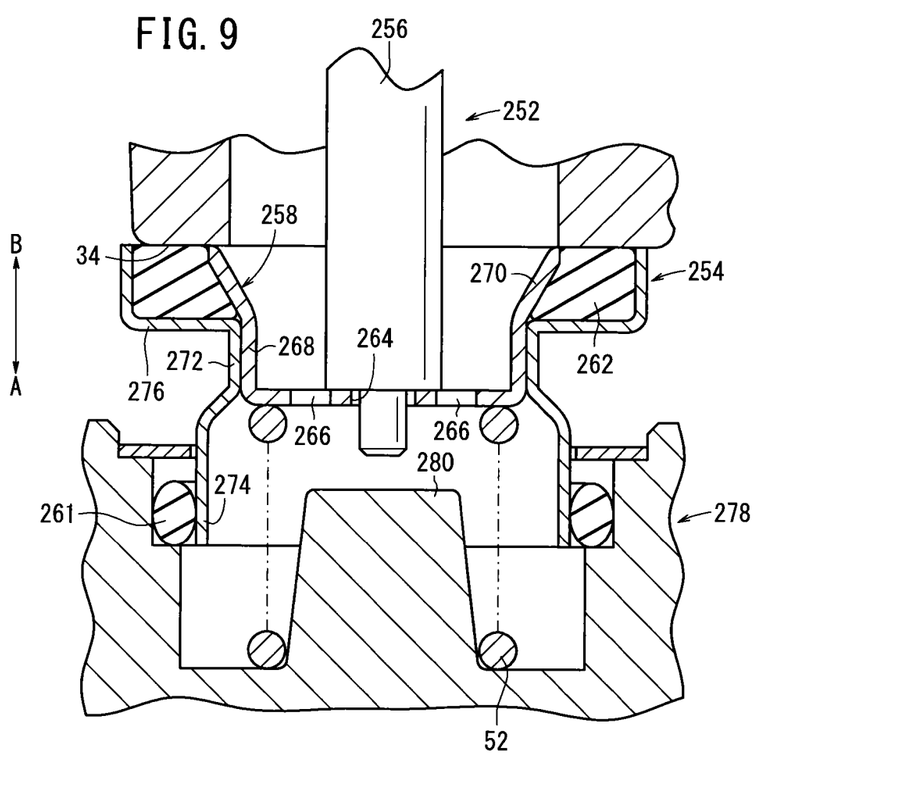
FIG. 9 is an enlarged cross sectional view showing the vicinity of a valve mechanism in the pressure reducing valve of FIG. 8.

Next, a pressure reducing valve 250 to which a valve structure for a fluid pressure device is applied according to a second embodiment is shown in FIG. 8 and FIG. 9. Constituent elements thereof, which are the same as those of the pressure reducing valve 10 according to the first embodiment are designated with the same reference numerals, and such features will not be described in detail below.

With the pressure reducing valve 250 according to the second embodiment, a valve plug 254 that constitutes a valve mechanism 252 comprises a first housing 258 connected to a lower end of a stem 256, and a cylindrical second housing 260 disposed on the outer circumferential side of the first housing 258. A packing (seal member) 262 is sandwiched and gripped between the first housing 258 and the second housing 260.

The first housing 258 is formed with a U-shape in cross section, the bottom part thereof being disposed and oriented downwardly. A hole 264 into which a lower end of the stem 256 is inserted is formed in the center of the bottom part, together with a plurality of communication holes 266, which are separated radially outward with respect to the hole 264.

Further, the first housing 258 is equipped with an outer wall 268, which is bent at a right angle from an outer edge of the bottom part, and a tapered part 270, which is inclined so as to expand in diameter in the radial outward direction from an upper end of the outer wall 268.

The second housing 260 is made up from a base 272 into which the outer wall 268 of the first housing 258 is fitted, a skirt 274 formed on a lower part of the base 272 and which extends downwardly while expanding in diameter in a radial outward direction, and a packing retainer 276 formed on an upper part of the base 272, which after extending horizontally in a radial outward direction, is bent and extends upwardly at a right angle. In addition, the second housing 260 is connected integrally with the first housing 258 through the base 272, and together therewith, an o-ring 261 is disposed between the outer circumferential surface of the skirt 274 and the communication chamber 24 of the body 16, whereas the annular packing 262 is mounted in the packing retainer 276 and is gripped between the second housing 260 and the tapered part 270 of the first housing 258.

A spring holder 278 is mounted on a lower part of the body, and a valve guide 280, which projects upwardly, is provided in the center of the spring holder 278. In addition, the valve spring 52 is inserted on the outer circumferential side of the valve guide 280 and is interposed between the spring holder 278 and a bottom part of the second housing 260.

Additionally, in a valve-open state in which the valve plug 254 is displaced downwardly to separate away from the valve seat 34, a portion of the pressure fluid that passes through the communication passage 32 flows in a downward direction of the first housing 258 through the communication holes 266 of the first housing 258, and therefore, the pressure on the upper side (in the direction of the arrow B) and the pressure on the lower side (in the direction of the arrow A) of the valve plug 254 including the first housing 258 are the same. More specifically, the pressing force on the valve plug 254 from the pressure fluid acting in the axial directions (the directions of arrows A and B) is equalized, and thus does not bias or urge the valve plug 254.

Figure 10A:
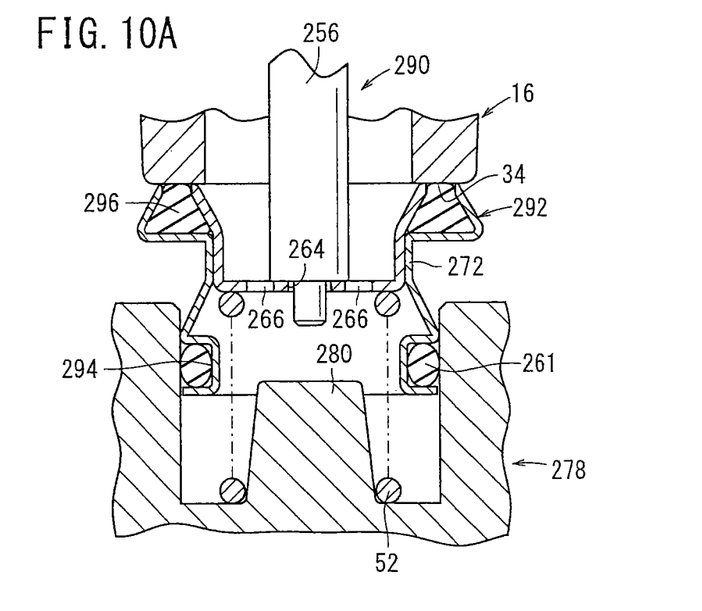
FIG. 10A is an enlarged cross sectional view of the vicinity of a valve mechanism including a valve plug according to a fourth modification.

The valve mechanism 252 that constitutes the pressure reducing valve 250 according to the second embodiment is not limited to the configuration described above. For example, as in a valve mechanism 290 shown in FIG. 10A, a configuration may be provided in which an annular recess 294, which is recessed in a radial inward direction, is provided on the lower end of a second housing 292, with the o-ring 261 being installed in the annular recess 294. Together therewith, the upper end of the second housing 292 may be bent at a predetermined angle in a radial inward direction, whereby a packing (seal member) 296, which is triangular in cross section, is gripped between the second housing 292 and the first housing 258.

Figure 10B:
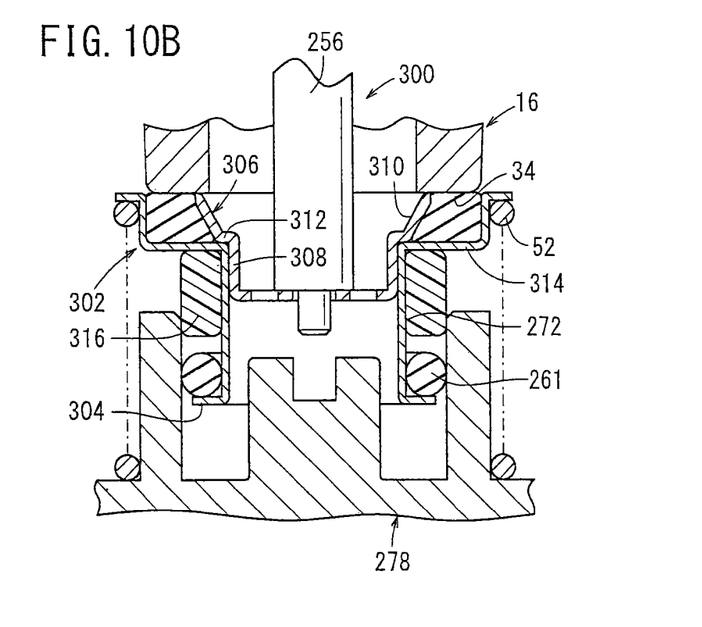
FIG. 10B is an enlarged cross sectional view of the vicinity of a valve mechanism including a valve plug according to a fifth modification.

Further, as in a valve mechanism 300 shown in FIG. 10B, a flange 304 capable of supporting the o-ring 261 may be provided on a lower end of a second housing 302, and together therewith, a step 312 may be disposed at a boundary between a tapered part 310 and an outer wall 308 of a first housing 306, the step 312 extending slightly radially outward from the edge of the outer wall 308 and being engaged with respect to a packing retainer 314 of the second housing 302. A cylindrical pressing member 316 is provided on the outer circumferential side of the base 272, which prevents the o-ring 261 from becoming separated upwardly away from the flange 304. Further, owing thereto, mutual positioning of the first housing 306 and the second housing 302 can easily and reliably be carried out when the first housing 306 and the second housing 302 are assembled together.

Furthermore, because a structure is provided in which the o-ring 261 is retained by the second housing 302, it is unnecessary to provide an annular groove for the purpose of mounting the o-ring 261 on the side of the spring holder 278, and thus, machining costs for manufacturing the spring holder 278 can be reduced.

Further, in the above explanations, cases have been described in which the valve mechanisms 18, 100, 110, 252, 290, and 300 are applied to pressure reducing valves 10 and 250 that serve as a fluid pressure device. However, the invention is not limited to such an application, and the present invention may be used, for example, in an opening/closing valve, which is capable of switching the flow state of a fluid by closing and opening a valve plug.

The valve structure for a fluid pressure device according to the present invention is not limited to the aforementioned embodiments. It is a matter of course that various alternative or modified configurations could be adopted without departing from the essence and gist of the invention as set forth in the appended claims.

The invention claimed is:

1. A valve structure for a fluid pressure device having ports for supplying and discharging a pressure fluid, and which is capable of adjusting a flow condition of the pressure fluid that flows in an interior of a housing through the ports, comprising:

a casing comprising a body of rotation about an axis to define an interior space radially therein, the interior space being exteriorly limited in a radial direction by the body of rotation, the casing being disposed displaceably in the interior of the housing;

an annular seal member disposed in the interior space of the body of rotation, and which is seatable on a valve seat formed in the housing;

a retaining member disposed in the interior space of the body of rotation, and which has a first connector projecting in an axial direction of the body of rotation and retains the seal member between the retaining member and the body of rotation of the casing, wherein the first connector is inserted into a second connector of the casing, the second connector projecting in the axial direction of the body of rotation, and is integrally connected to the body of rotation; and a stem inserted in the first connector that is inserted into the second connector, wherein the casing and the seal member are displaceable via the stem in directions to approach toward, and separate away from, the valve seat, wherein the casing is shaped to permit insertion of the seal member and comprises a seal retainer capable of retaining the seal member disposed therein, the retaining member being provided at an inner circumferential side of the seal retainer, and wherein the retaining member comprises a tapered part that is sloped to gradually expand in diameter in a direction opposite to an insertion direction of the seal member with respect to the casing, and wherein, when the retaining member is inserted into the casing after the seal member, the seal member is sandwiched and gripped between the tapered part and the seal retainer.

2. The valve structure according to claim 1, wherein the seal retainer is provided laterally of the valve seat relative to the axial direction of the casing.

3. The valve structure according to claim 2, wherein the seal retainer includes an outer wall disposed on an outer circumferential side of the seal member, the outer wall being inclined so as to become reduced in diameter in a radial inward direction gradually approaching toward the tapered part.

4. The valve structure according to claim 2, wherein the first connector is welded or bonded to the second connector.

5. The valve structure according to claim 2, wherein the first connector is press-inserted into an interior portion of the second connector.

6. The valve structure according to claim 2, wherein the first connector is screw-engaged with the second connector.

7. The valve structure according to claim 2, wherein the first connector is attached by crimping with respect to the second connector.

8. The valve structure according to claim 2, wherein the first connector comprises a projection that projects in a radial outward direction, the projection being placed in engagement with an engagement part of the second connector.

9. The valve structure according to claim 1, the seal member further comprising a sealing part provided on at least one side surface facing toward the casing or on another side surface facing toward the valve seat, and which protrudes from the one side surface and/or the other side surface.

10. The valve structure according to claim 1, further comprising a projection provided on at least one of the valve seat and a side surface of the casing facing toward the seal member, and which protrudes toward a side of the seal member.

* * * * *